United States Patent Office 2,891,860
Patented June 23, 1959

2,891,860
COPPER BASE BRAZING ALLOY

Thomas L. Woolard, Wellsville, N.Y.

No Drawing. Application August 13, 1957
Serial No. 678,463

5 Claims. (Cl. 75—159)

This application is a continuation in part of application Serial No. 517,380, filed June 22, 1955, now abandoned, and it relates generally to the brazing art. More particularly, it relates to a specific composition of metal alloy which finds special utility as a brazing medium to be used in brazing mild, low alloy or stainless steels that are selected for use in high temperature zones which frequently prevail in heat exchangers receiving hot exhaust gases from gas turbines or other similar devices.

The metallic components comprising a heat exchanger receiving hot exhaust gases from a gas turbine are continuously exposed to temperatures ranging from 900° F. to 1200° F. To be entirely satisfactory, brazed joints bonding together such component parts of a heat exchanger must be capable of withstanding these high temperatures for long uninterrupted periods of time at relatively high pressures ranging from 60 p.s.i. to 100 p.s.i. With these extremes of temperature and pressure, it is imperative that the material used as a bonding agent at the various joints have sufficient strength that its tendency toward creep and ultimate failure will be reduced to a minimum.

The most common brazing material having a reasonably high melting temperature is copper which may be used at various temperatures ranging upward to 900° F. Since copper is easily worked and provides nominal strength in the lower temperature ranges, its use for brazing has become an accepted method of fabrication. However, copper does not have complete resistance to corrosion and oxidation and its ultimate strength and resistance to creep is relatively low, especially when used at or near its higher temperature limits.

Other alloys have been developed for brazing the aforementioned metals but none have proved entirely satisfactory. Certain alloys containing various proportions of nickel have been developed with superior strength characteristics at temperatures ranging upward to 2000° F. However, these alloys are extremely hard, and due to their high melting temperature they present difficulties in being adapted to the brazing operation. Brazing alloys including silver and other precious metals have been developed to show extremely desirable characteristics; however, when cost is an important factor as in the manufacture of large heat exchangers, the use of such metals for brazing is for all practical purposes prohibited.

It is therefore an object of this invention to provide a high temperature brazing medium having high strength along with resistance to creep and corrosion at temperatures ranging from 900° F. to 1200° F.

It is a further object of this invention to provide a high temperature brazing medium having high strength and resistance to creep and corrosion combined with a relatively low brazing temperature.

It is a further object of this invention to provide a high temperature brazing medium which is malleable to the extent that it may be rolled into various forms to facilitate handling during brazing.

It is a still further object to provide a brazing medium whose constituents include only those elements that are generally available and may be economically obtained.

Accordingly, this invention is directed to a brazing alloy whose major constituent is copper which amounts to 85% to 95% of the total by weight. An amount of nickel ranging from 3.5% to 10.5% and chromium ranging from .825% to 2.44% is combined with boron from .175% to .56% and small amounts of iron, carbon and silicon not to exceed a total of 1.5%.

A preferred composition for a brazing alloy prepared in this manner comprises:

|  | Percent |
|---|---|
| Copper | 90.0 |
| Nickel | 7.0 |
| Chromium | 2.0 |
| Boron | .3 |
| Iron, carbon and silicon | .7 |

The boron present in this composition does not remain in the alloy after brazing, but during brazing it serves as a melting point depressant which effectively reduces the melting point of the brazing compound within limits readily attainable by commercially available furnaces. More specifically, while the melting point of pure copper is 1981° F., the melting point of the above defined brazing compound is but 1900° F., while the melting point of a similar alloy without the specified boron content would range in the zone of 2400° F. to 2600° F. Even though the melting point of this brazing alloy is less than that of pure copper, its value as a brazing material is much enhanced because of its greater strength and resistance to creep that may be attributed to its relatively high chromium and nickel content. Moreover, the high copper content of the brazing alloy causes it to remain malleable so that it may be formed into sheets or shapes as desired.

Brazing with this alloy is to be performed in a hydrogen or other reducing atmosphere as may be maintained in a brazing furnace at 1950° F. to 2150° F. During the brazing operation substantially all the boron content is vaporized and leaves the brazing alloy so that the temperature subsequently required to melt the alloy is increased to 2400° F.–2600° F. or the melting range of such an alloy less the prescribed boron content.

What I claim is:

1. A high strength copper base brazing alloy having a brazing temperature substantially lower than that of pure copper, said alloy comprising from 3.5% to 10.5% nickel, from .825% to 2.44% chromium, from .175% to .56% boron, and the balance essentially of copper.

2. A copper base brazing alloy having substantially greater strength and a lower brazing temperature than basic copper, said alloy consisting essentially of from 85% to 95% copper, from 3.5% to 10.5% nickel, from .825% to 2.44% chromium and from .175% to .56% boron.

3. A copper base brazing alloy having great strength at elevated temperatures consisting essentially of from 85% to 95% copper, 3.5% to 10.5% nickel, .825% to 2.44% chromium and sufficient boron to depress the melting point of the alloy substantially below that of copper.

4. A malleable copper base brazing alloy having great strength at elevated temperatures comprising about 90% copper, about 7% nickel, about 2% chromium, and sufficient boron to depress the melting point of the alloy to about 1900° F.

5. A malleable copper base brazing alloy having great strength and resistance to creep at elevated temperatures comprising about 90% copper, 7% nickel, 2% chromium and .3% boron, said boron being sufficient to lower the melting point of the alloy below that of pure copper.

(References on following page)

References Cited in the file of this patent

UNITED STATES PATENTS

| | | |
|---|---|---|
| 1,136,909 | Gleason | Apr. 20, 1915 |
| 2,033,709 | Hensel et al. | Mar. 10, 1936 |
| 2,142,673 | Hensel et al. | Jan. 3, 1939 |
| 2,210,314 | Wright | Aug. 6, 1940 |
| 2,479,311 | Christensen et al. | Aug. 16, 1949 |
| 2,755,182 | Cape | July 17, 1956 |
| 2,768,893 | Bredzs | Oct. 30, 1956 |
| 2,854,332 | Bredzs et al. | Sept. 30, 1958 |

OTHER REFERENCES

A.I.M.E., 1935, "Modern Uses of Non Ferrous Metals," 2nd edition, page 142.